United States Patent
Hennebert et al.

(10) Patent No.: US 12,271,894 B2
(45) Date of Patent: Apr. 8, 2025

(54) METHOD OF SELECTIVE AUTHENTICATION OF A BLOCKCHAIN USER WITH A SMART CONTRACT

(71) Applicant: COMMISSARIAT A L'ENERGIE ATOMIQUE ET AUX ENERGIES ALTERNATIVES, Paris (FR)

(72) Inventors: Christine Hennebert, Grenoble (FR); Thomas Duverney, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 541 days.

(21) Appl. No.: 17/014,231

(22) Filed: Sep. 8, 2020

(65) Prior Publication Data

US 2021/0073796 A1 Mar. 11, 2021

(30) Foreign Application Priority Data

Sep. 9, 2019 (FR) ...................................... 19 09894

(51) Int. Cl.
*H04L 9/00* (2022.01)
*G06Q 20/36* (2012.01)
(Continued)

(52) U.S. Cl.
CPC ....... *G06Q 20/3674* (2013.01); *G06Q 20/401* (2013.01); *H04L 9/3236* (2013.01);
(Continued)

(58) Field of Classification Search
CPC ............. G06Q 20/3674; G06Q 20/401; G06Q 2220/00; H04L 9/3236; H04L 9/3247; H04L 9/50; G06F 21/64
See application file for complete search history.

(56) References Cited

U.S. PATENT DOCUMENTS 11,538,031 B2 * 12/2022 Madisetti .................. H04L 9/14
2018/0330349 A1 * 11/2018 Uhr ........................ H04L 9/0643
(Continued)

FOREIGN PATENT DOCUMENTS

CN 111033489 A * 4/2020 ......... G06F 16/2255

OTHER PUBLICATIONS

Daniele Fornaro, Elliptic curve hierarchical deterministic private key sequences: bitcoin standards and best practices, 2018, pp. 1-47 (Year: 2018).*

(Continued)

*Primary Examiner* — Kevin Ayala
(74) *Attorney, Agent, or Firm* — Oblon, McClelland, Maier & Neustadt, L.L.P.

(57) ABSTRACT

An authentication method for a user who has a hierarchical deterministic keys wallet including a path between the user's master private key and a private key specific to a smart contract, the path including a plurality of branches each carrying an index, the smart contract being univocally identified by one or several indices of branches followed by the path. The user can issue a transaction from an issuing account address, obtained by hashing the public key corresponding to the specific private key in an asymmetric cryptosystem, and can sign this transaction using the specific private key. The smart contract uses the signature to verify that the transaction was really issued from the issuing account address in question.

13 Claims, 3 Drawing Sheets

(51) Int. Cl.
*G06Q 20/40* (2012.01)
*H04L 9/32* (2006.01)

(52) U.S. Cl.
CPC ....... *H04L 9/3247* (2013.01); *G06Q 2220/00* (2013.01); *H04L 9/50* (2022.05)

(56) References Cited

U.S. PATENT DOCUMENTS

2020/0320529 A1* 10/2020 Lyadvinsky .......... H04L 9/3239
2021/0083872 A1* 3/2021 Desmarais ............ H04L 9/3247

OTHER PUBLICATIONS

French Preliminary Search Report issued Jun. 23, 2020 in French Application 19 09894 filed Sep. 9, 2019 (with English Translation of Categories of Cited Documents), 2 pages.

Di Luzio et al, "Arcula: A Secure Hierarchical Deterministic Wallet for Multi-asset Blockchains", Arxiv.org, Jun. 13, 2019, XP081549181, 33 pages.

Fornaro, "Elliptic Curve Hierarchical Deterministic Private Key Sequences: Bitcoin Standards and Best Practices", Apr. 19, 2018, XP055688466, URL: https://www.politesl.polimi.it/bitstream/10589/140112/1/201804Fornaro.pdf, 53 pages.

Antonopoulos, "Mastering Bitcoin—Unlocking Digital Cryptocurrencies", In: Mastering bitcoin: [unlocking digital cryptocurrencies], O'Reilly Media, Dec. 20, 2014, XP055306939, 286 pages.

Antonopoulos et al., "Mastering Ethereum", O'Reilly Media, 2019, 415 pages.

U.S. Appl. No. 16/234,020, filed Dec. 27, 2018 2019/0207760 A1 Hennebert, C.

U.S. Appl. No. 16/233,974, filed Dec. 27, 2018 2019/0207757 A1 Hennebert, C.

U.S. Appl. No. 16/363,395, filed Mar. 25, 2019 2019/0294817 A1 Hennebert, C, et al.

U.S. Appl. No. 16/363,546, filed Mar. 25, 2019 2019/0294822 A1 Hennebert, C.

* cited by examiner

METHOD OF SELECTIVE AUTHENTICATION OF A BLOCKCHAIN USER WITH A SMART CONTRACT

TECHNICAL FIELD

This invention relates to the general field of blockchains, and more particularly to the field of smart contracts.

STATE OF PRIOR ART

Some blockchains can be used to record smart contracts. Ethereum is one example of such a blockchain. Hyperledger is another example of such a blockchain.

Remember that a smart contract is a program that is implemented (in other words stored) in the blockchain and that can be executed by any node on the network. In general, a smart contract can store data, send and receive payments, store an amount in cryptocurrency (ether in Ethereum), and execute actions independently and in a decentralised manner as a software agent. In general, a smart contract verifies if a number of input conditions are satisfied, and if so, runs automatically to provide a coded result in the contract.

To trigger execution of a smart contract, a transaction must be issued from the wallet address of a user of the blockchain to the address of the smart contract. According to the Ethereum terminology, the transaction is issued by an EOA (Externally Owned Account) to a contract account. A distinction is made between EOAs that are controlled by users by means of wallet applications, and contract accounts that are controlled by self-standing software codes (or smart contracts) executed by the Ethereum Virtual Machine (EVM). Unlike contract accounts, wallet accounts (EOAs) do not have any storage capacity or internal code execution resources.

Each user account is associated with a public key-private key pair of an asymmetric cryptosystem, generally an elliptic curve cryptosystem, the address of the user account being obtained by hashing the public key in question. On the other hand, the private key is known only to the user.

When the user wants to transmit a transaction to the blockchain from his account, he signs it with his private key, for example by means of the ECDSA (Elliptic Curve Digital Signature Algorithm) algorithm. Everyone can then check that the transaction has actually been signed by the account holder. In particular, when a smart contract receives a transaction, the smart contract can use the account address of the user who issued the transaction to assure that it was actually signed by the account holder. This authentication mechanism is systematic and takes place before the check on execution conditions of the smart contract.

In general, a distinction is made between two types of smart contracts: smart data recording contracts and token usage contracts.

A smart data recording contract can record data or data footprints in the distributed register of the data blockchain. Such a smart contract is deployed on the distributed register and therefore is addressable and accessible by all users of the blockchain.

Even if the user's account address cannot be used to obtain the user's identity directly, it is nevertheless true that his transactions can be audited and traced due to the public nature of the distributed register. Thus, transactions issued to different smart contracts can be correlated, that can lead to its identity being obtained. A user may thus want it to be impossible for an external auditor to establish a link between transactions that he originates addressed to distinct contracts.

A second type of smart contract uses tokens, also called cryptoassets. A token is different from a cryptocurrency (such as for example ether or bitcoin) associated with a blockchain in the sense that it is not recognised by the protocol managing the blockchain. Tokens are generated exclusively by smart contracts that are also responsible for operations related to their ownership, transfers and access rights. Cryptoassets recently enjoyed considerable success as supports for fundraising in Initial Coin Offerings (ICO).

Smart contracts using tokens, and smart contracts managing data recording, can be audited by nature of the blockchain. In particular, when the address of a smart contract is known, it can be viewed to know the balance in tokens of each holder. Operations performed by the same holder can then be reconciled and his activity can be monitored by monitoring movements of his cryptoassets from one smart contract to the other.

In order to protect the confidentiality of operations that he performs on the blockchain by referring to smart contracts, a user can make use of different accounts (and therefore different addresses), each account being uniquely associated with a public key-private key pair. The set of private keys associated with account addresses is kept in a keys wallet specific to the user.

Generally, a distinction is made between non-deterministic (or random) wallets and deterministic wallets.

In a non-deterministic wallet, also known under the acronym JBOK (Just a Bunch Of Keys), the keys are generated at random. This type of wallet is not structured and therefore is management is complex. Furthermore, maintenance of the wallet implies that relatively complex backup operations are made. Finally, if the wallet is lost, the user will no longer have access to his cryptoassets.

To overcome these difficulties, use is generally made of hierarchical deterministic wallets wherein all private keys are generated in a tree structure from the same germ. In other words, with knowledge of the germ, it is possible to find all private keys of the wallet. A description of the structure of deterministic wallets is given in the book by A. M. Antonoupulos et al. entitled "Mastering Ethereum" pages 79-97.

FIG. 1 diagrammatically represents the interaction of a user equipped with a hierarchical deterministic wallet with two smart contracts, deployed on a blockchain.

In this case the user holds a keys wallet 110 containing a first private key, $k_{user}^1$, and a second private key, $k_{user}^2$, derived deterministically from a master private key, $k_{user}^m$. The corresponding public keys in an asymmetric cryptosystem are denoted $PK_{user}^1$, $PK_{user}^2$. For example, in the case of an elliptic curve cryptosystem, they are obtained by $PK_{user}^1 = k_{user}^1 \cdot G$ and $PK_{user}^2 = k_{user}^2 \cdot G$ in which G is the generation point of the elliptic curve. The addresses of the user accounts from which the user will be able to issue transactions to a blockchain, are obtained from the public keys by means of a hashing function or a combination of hashing functions, namely:

[Math. 1]

$$\text{account}_{user}^i = \text{Hash}(PK_{user}^i), \; i=1,2 \qquad (1)$$

in which Hash corresponds to a hashing function or to a combination of hashing functions.

The user can then start from his account address $\text{account}_{user}^1$, and send a transaction $\text{trans}_1$ signed using the private key $k_{user}^1$, to the smart contract $SC_1$ deployed on the blockchain 120. Similarly, he can then start from his account address account$_{user}{}^2$, and send a transaction trans$_2$ signed using the private key k$_{user}{}^2$, to the smart contract SC$_2$. Therefore a third party user cannot correlate the origins of the two transactions.

The transactions may include data (or data footprints) to be recorded when the contracts are of the first type or instructions related to tokens when the contracts are of the second type.

In all cases, even with a hierarchical deterministic wallet, a user will need to keep and maintain a table in memory containing relations between account addresses and smart contracts to be able to authenticate himself with them.

Consequently, the purpose of this invention is to disclose an authentication method that a user can use to authenticate himself with smart contracts deployed on a blockchain without having to manage the complexity of a keys wallet and without compromising the confidentiality of operations that he performs using these contracts.

Presentation of the Invention

This invention is defined by a method of authenticating a user of a blockchain with a smart contract deployed on said blockchain, the user having a hierarchical deterministic private key generation wallet, organised in a tree structure, the user transmitting a transaction to the smart contract, said method being specific in that:
 the hierarchical deterministic wallet comprises a path within the tree structure, between a master private key of the user at the root of the tree structure, and a private key specific to said smart contract, the user having a issuing account address obtained by hashing a public key corresponding to said specific private key in an asymmetric cryptosystem, said path using a plurality of branches within the tree structure, each branch having an index, the smart contract being univocally identified by one or several indices of branches followed by said path;
 the user generates a transaction and signs it using the specific private key before transmitting it to the smart contract;
 the smart contract, after reception of the transaction, verifies the validity of the signature from the issuing account address and if the transaction was actually issued by the issuing account address.

Advantageously, one or several indices of branches of said path are given by the name of the smart contract and/or the symbol defining this contract and/or the address of this contract on the blockchain.

The hierarchical deterministic wallet is preferably conforming with the BIP-32 structure.

According to one example embodiment, the index of a branch of said path is the symbol defining the contract.

According to another example embodiment, the contract address on the blockchain is represented by a plurality of bytes and the indices of a sequence of branches of said path are the bytes of said plurality.

In this case, the last branch of the sequence of branches leads to a leaf of the tree structure, the specific private key being generated at this leaf.

BRIEF DESCRIPTION OF THE FIGURES

Other characteristics and advantages of the invention will become clear after reading a preferred embodiment of the invention, described with reference to the appended figures among which.

DESCRIPTION OF EMBODIMENTS

In the following, we will consider the interaction of a user of a blockchain (for example such as Ethereum) with a smart contract deployed on this chain.

It is assumed that the user has a hierarchical deterministic keys wallet.

Figure 1:
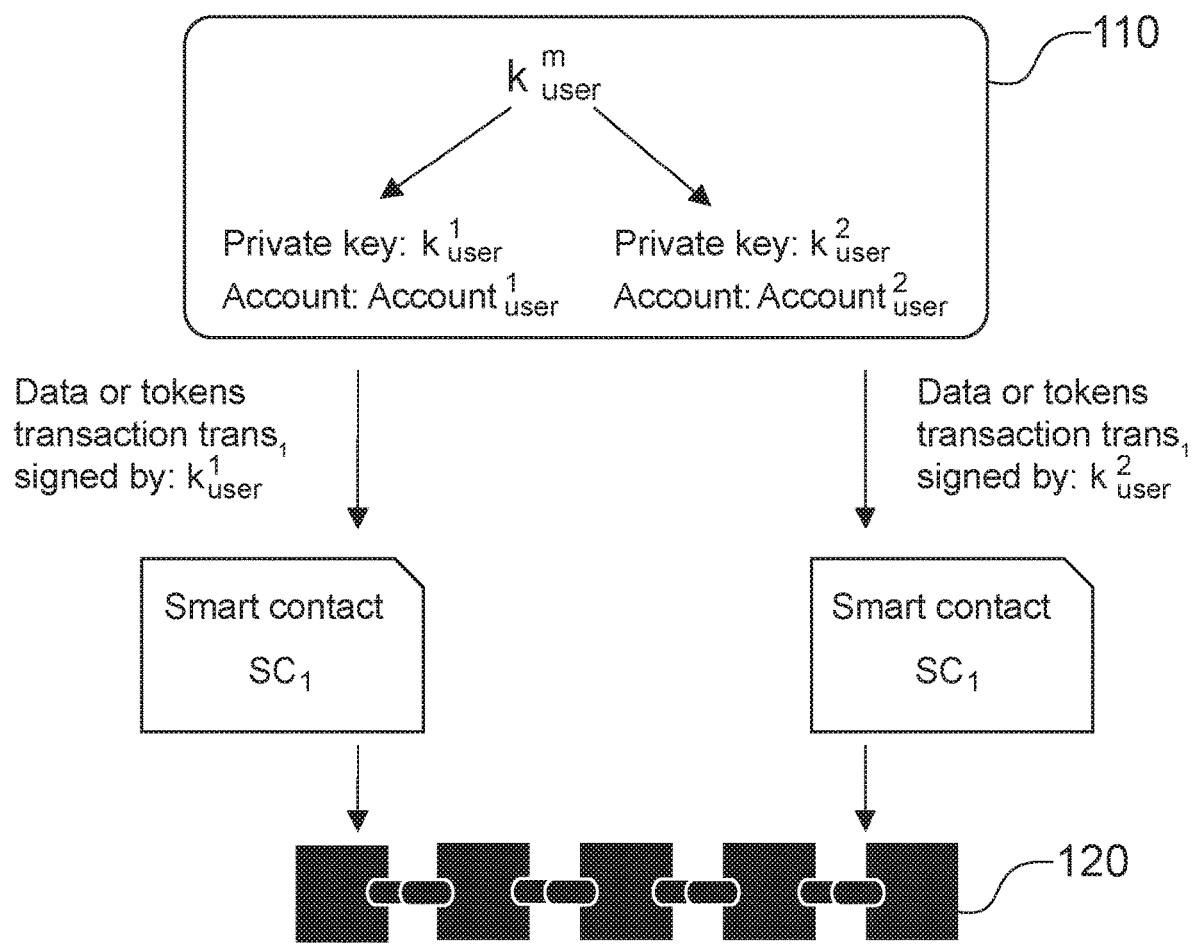
FIG. 1, already described, schematically represents the interaction of a user equipped with a hierarchical deterministic wallet with two smart contracts, deployed on a blockchain.
Figure 2:
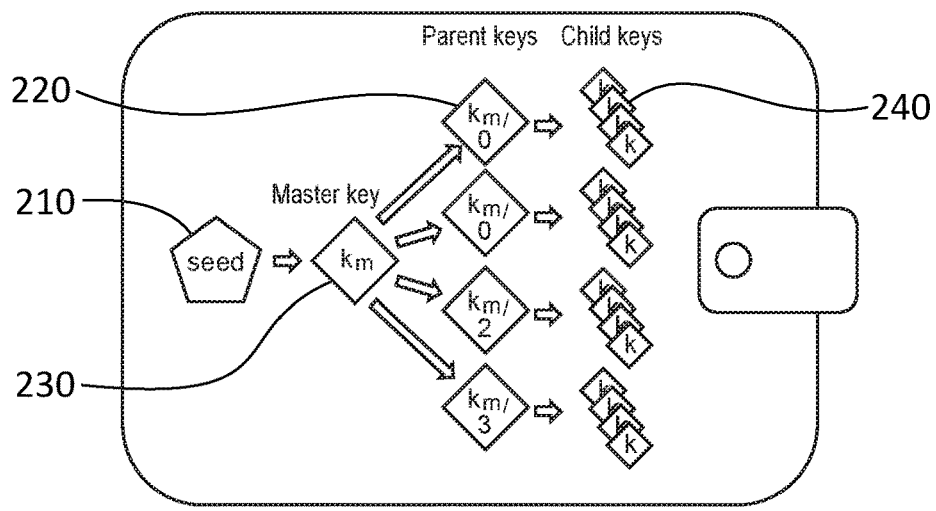
FIG. 2 schematically represents the structure of a hierarchical deterministic wallet.

FIG. 2 schematically represents the structure of such a hierarchical deterministic wallet.

The germ, 210, at the origin of the keys wallet is a random number (or entropy), for example on 128 or 256 bits. It is generally represented by a mnemonic code composed of 12 or 24 words drawn from a predetermined dictionary comprising a predetermined number of words (2048).

The germ is then hashed (for example by means of the HMAC-SHA hashing function 512), to give firstly a master private key, 220, (k$_m$) and an associated chain code (not represented).

The master public key is then calculated from the master private key using PK$_m$=k$_m$·G in which G is the elliptic curve generation point.

In each generation, a child parent key, 240, with birth rank i+1 (the first child corresponding to the null index), is obtained from a parent private key, 230, of the chain code associated with this key and an index number, i. Generation of the private key makes use of a hashing function (or a combination of hashing functions) making it impossible to obtain a parent private key from the private key of a child.

Different methods can be used to generate private keys in a hierarchical deterministic wallet.

Figure 3A:
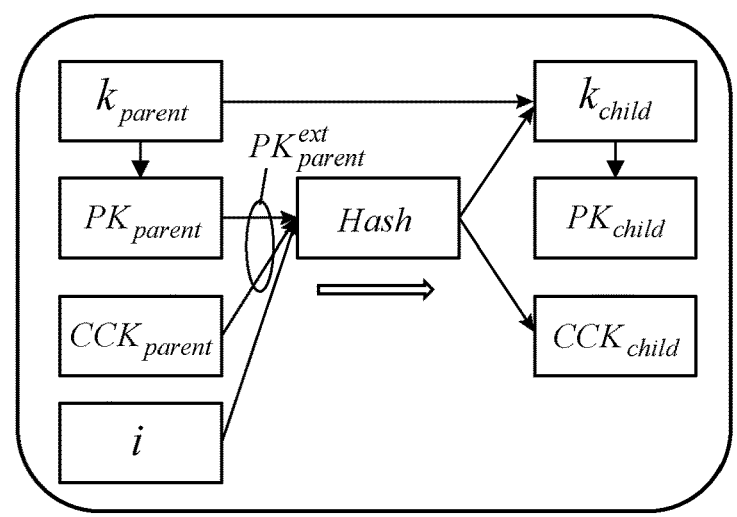
FIG. 3A.

FIG. 3A represents a first method of generating private keys in a hierarchical deterministic wallet.

Elements related to a parent private key are represented at the left of the figure, and elements related to a child private key derived from this parent private key are represented at the right.

The parent private key, k$_{parent}$, can be used firstly to generate the corresponding public key in the asymmetric cryptosystem, for example PK$_{parent}$=k$_{parent}$G in the case of an elliptic curve cryptosystem.

The parent public key PK$_{parent}$ is concatenated to the associated code chain, CCK$_{parent}$, to form an extended public key PK$_{parent}{}^{ext}$=PK$_{parent}$|CCK$_{parent}$. This extended public key is combined with the index, i, of the child key that is to be generated, the assembly is then hashed using a hashing function, Hash.

The result of hashing is divided into a left part and a right part. The left part is combined with the parent private key, k$_{parent}$, to give the child private key, k$_{child}$ while the right part gives the code chain associated with the child key, namely CCK$_{child}$. The child private key, k$_{child}$, is used to generate the child public key, PK$_{child}$=k$_{child}$G.

Consequently, elements $k_{child}$, $PK_{child}$, $CCK_{child}$ are available to iterate the generation of private keys once again.

The generation operation used to pass from a parent private key to a child key with index i is denoted herein $CKD_{priv}^n$. In other words:
[Math. 2]

$$k_{child} = CKD_{priv}^n(k_{parent}, i) \quad (2)$$

and therefore by recurrence:
[Math. 3]

$$k_{child} = CKD_{priv}^n(\ldots CKD_{priv}^n(CKD_{priv}^n(k_m, i_1), i_2)), \ldots, i_N) \quad (3)$$

in which N is the path length in the tree structure starting from the germ, and in which $i_1, \ldots, i_N$ is the succession of indices of child keys along the path.

Figure 3B:
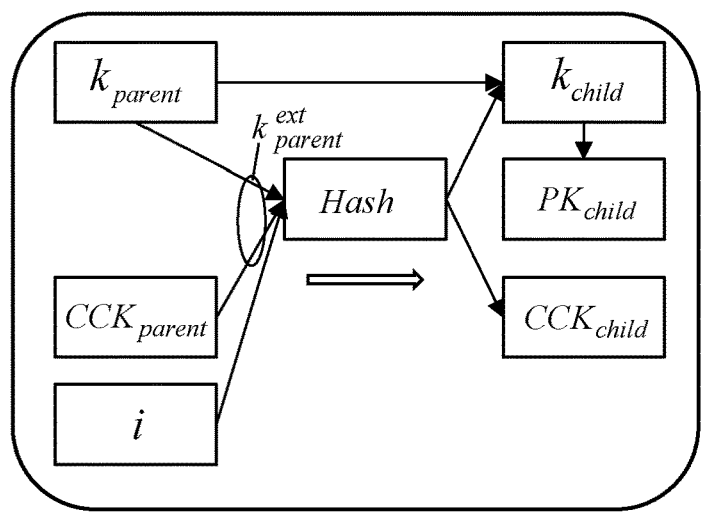
FIG. 3B represent a first and a second method respectively of generating private keys in a hierarchical deterministic wallet.

FIG. 3B represents a second method of generating private keys in a hierarchical deterministic wallet.

This generation method, called the hardened method in contrast to the previous method called the normal method, uses an extended private key instead of an extended public key to generate a private key in the next generation. It is a priori more robust that the normal method because it omits public information from the calculation.

As before, elements related to a parent private key are represented at the left of the figure, and elements related to a child private key derived from this parent private key are represented at the right.

The parent private key, $k_{parent}$, is concatenated with the associated code chain to form an extended private key $k_{parent}^{ext} = k_{parent} | CCK_{parent}$.

This extended private key is combined with the index, i, of the child key that is to be generated, the assembly is then hashed using a hashing function, Hash.

The result of hashing is divided into a left part and a right part. The left part is combined with the parent private key, $k_{parent}$, as before, to give the child private key, $k_{child}$ while the right part gives the code chain associated with the child key, namely $CCK_{child}$. The child private key, $k_{child}$, is used in turn to generate the child public key, $PK_{child} 32 k_{child} G$.

The generation operation used to pass from a parent private key to a child key with index i is called the hardened generation operation and is denoted herein $CKD_{priv}^h$. In other words:
[Math. 4]

$$k_{child} = CKD_{priv}^h(k_{parent}, i) \quad (4)$$

If only hardened generation operations are used, the following is obtained by recurrence:
[Math. 5]

$$k_{child} = CKD_{priv}^h(\ldots CKD_{priv}^h(CKD_{priv}^h(k_m, i_1), i_2)), \ldots, i_N) \quad (5)$$

in which, as before, N is the path length in the tree structure starting from the germ, and in which $i_1, \ldots, i_N$ is the succession of indices of child keys along the path.

It will be noted that a private key of the wallet can be generated by successively using normal generation operations and hardened generation operations along the path. Thus, more generally, this private key will be obtained by:
[Math. 6]

$$k_{child} = CKD_{priv}(\ldots CKD_{priv}(CKD_{priv}(k_m, i_1), i_2)), \ldots, i_N) \quad (6)$$

in which each elementary generation operation $CKD_{priv}$ can be a normal generation operation $CKD_{priv}^n$ or a hardened generation operation $CKD_{priv}^h$.

In practice, the indices i used in normal generation operations and hardened generation operations take their values within distinct intervals. Thus, the indices varying from 0 to $2^{31}-1$ are used to generate private keys according to a normal generation operation and indices varying from $2^{31}$ to $2^{32}-1$ are used to generate private keys according to a hardened generation operation.

In all cases, a private key can be identified by means of a generation path in the tree structure starting from the master private key. Thus for example, m/0/3 will denote the second generation private key, $4^{th}$ normal child of the parent key, itself the first normal child of the master private key. Similarly, m/0/3' will denote the second generation private key, $4^{th}$ hardened child of the parent key, itself the first normal child of the master private key, in which the convention used is $i'=i+2^{31}$.

The basic concept of this invention is that for each smart contract, SC that the user needs to interact with, a specific private key, $k_{user}^{SC}$, is provided, said specific private key being identified by a generation path within the tree structure, at least one node on this path being indexed by an identifier of the smart contract. The address of the user account from which the user sends transactions to the smart contract is obtained by hashing the public key associated with the specific private key in the asymmetric cryptosystem.

With the preceding conventions:
[Math. 7]

$$k_{user}^{SC} = CKD_{priv}(\ldots CKD_{priv}(CKD_{priv}(k_{user}^m, i_1), i_2)), \ldots, i_N) \quad (7)$$

in which at least one of the indices $i_1, \ldots, i_N$ is an identifier of the smart contract SC and $k_{user}^m$ is the user's master private key. In an elliptic curve cryptosystem, the public key corresponding to the specific private key is $PK_{user}^{SC} = k_{user}^{SC} \cdot G$ and the address of the user account dedicated to interact with the smart contract is given by:
[Math. 8]

$$\text{account}_{user}^{SC} = \text{Hash}(PK_{user}^{SC}) \quad (8)$$

The key generation path within the tree structure of the wallet is given by a succession of branches, according to indices forming a path from the root m of a tree to the leaf identified by the last index:
[Math. 9]

$$m/\ldots/Id_{SC}/\ldots \quad (9)$$

in which $Id_{SC}$ is an index univocally identifying the smart contract SC.

In other words, the wallet has a tree structure (in the sense of the graph theory), the arcs being output from a parent node, or equivalently, the son nodes being indexed by the above-mentioned indices. Thus, the succession of indexes (9) defines a path between the root and a leaf of the tree.

The smart contract is written in a computer language (for example such as Solidity). It comprises a "constructor", in other words a function that is only executed once and that initialises the state of the contract. When this function is called, it initialises the contract, for example by attributing a number of tokens to the account from which it was deployed on the blockchain. The constructor can also attribute a symbol to the smart contract (that may be a 3-letter symbol identifying the token to which the contract is applicable).

The contract also has a name that is not necessarily the name of the constructor.

Finally, once deployed on the blockchain, the smart contract is associated with a unique address (represented on 20 bytes) at which it is stored and that is used to address it.

The identifier of the smart contract can be the result of the selection or the combination of the above-mentioned elements: contract name, symbol defining the contract, contract address. In all cases, the identifier must be unique and specific to the smart contract concerned such that any two smart contracts deployed on the blockchain are associated with distinct identifiers.

If the hierarchical deterministic (HD) wallet is in the BIP-32 format, the index of each node must be between 0 and $2^{31}-1$, the MSB being used to make a distinction between a normal generation and a reinforced generation. In other words, each index can be represented on 4 bytes.

In this case, it would be possible for example for the identifier of the smart contract to be the symbol $symbol_{SC}$ (on 3 bytes) that defines it, the generation path of the specific private key then being in the form:
[Math. 10]

$$m/\ldots/symbol_{SC} \quad (10)$$

In this example, the path begins at the root of the tree, continues through a series of indices representing successive branches (or nodes) and terminates with the symbol $symbol_{SC}$ representing a leaf of the tree structure of the hierarchical wallet.

Alternatively, and still assuming that the HD wallet is in the BIP-32 format, the contract address can be used by splitting it into several indices, each with 4 bytes. More precisely, if the 20 bytes (with increasing weight) of the smart contract address are denoted $add_{SC}^0, \ldots, add_{SC}^{19}$, the generation path of the specific private contract can be in the following form:
[Math. 11]

$$m/\ldots/add_{SC}^{19}\ldots add_{SC}^{16}/add_{SC}^{15}\ldots add_{SC}^{12}/$$
$$add_{SC}^{11}\ldots add_{SC}^{8}/add_{SC}^{7}\ldots add_{SC}^{4}/$$
$$add_{SC}^{3}\ldots add_{SC}^{0} \quad (11)$$

In other words, with the notation conventions for expression (7), the index $i_N$ is formed by the concatenation of bytes $add_{SC}^3\ldots add_{SC}^0$, the index $i_{N-1}$ is formed by the concatenation of bytes $add_{SC}^7\ldots add_{SC}^4$ etc. The indices $i_{N-3}$ to $i_N$ of the different branches in the tree structure univocally identify the smart contract SC. In this example, the branch with index $i_N$ leads to a leaf of the tree structure.

Figure 4:
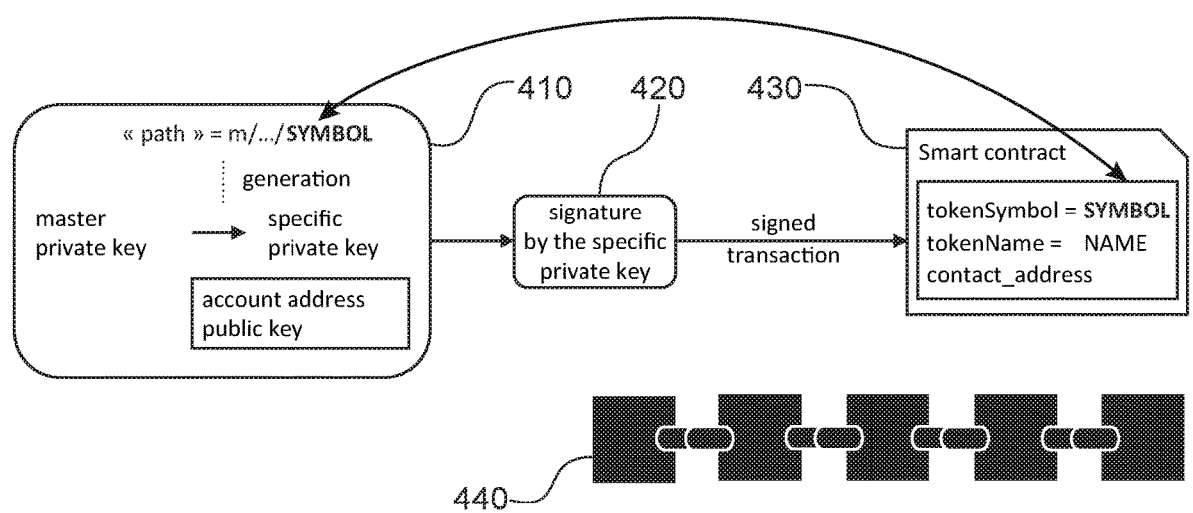
FIG. 4 schematically represents the interaction of a user equipped with a hierarchical deterministic wallet with a smart contract, according to one embodiment of the invention.

When the user wants to interact with the smart contract, he sends a transaction to it as indicated schematically on FIG. 4.

The HD wallet of the user's private keys is represented as 410. The private key specific to the smart contract, 430, SC is generated using a path in the tree structure of the wallet, said path being identified by a succession of branch indices in the tree structure of the hierarchical wallet.

In the case illustrated, the path terminates at a leaf with the SYMBOL index univocally identifying the smart contract.

The transaction is signed in 420 using said specific private key. More precisely, the transaction is hashed using a hashing function (or a combination of such functions) and the ECDSA signature is then calculated (components r, s or even (r, s, v) in which v identifies the chain (for example Ethereum).

The transaction is sent from the EOA (Externally Owned Account) public address, obtained by hashing the public key corresponding to said specific private key in the asymmetric cryptosystem. The transaction is then propagated on the P2P network of the blockchain, 440.

On reception, the smart contract SC uses the signature to verify if the transaction was really issued from the EOA public address. More precisely, the smart contract can deduce if the transaction was actually signed by the specific private key, from components of the signature and the account address (this address being obtained by hashing the user's public key) of the issuer who issued the transaction. The smart contract thus authenticates the issuer. It should be noted that this authentication can also be made by any node in the blockchain. After having authenticated the issuer and assuring that the different input arguments satisfy the conditions specified in the contract, the smart contract executes the called function (also called method).

The transaction sent by the address of the user's issuing account can be in the following general form:
Transaction: {
'from': @account_issuer
'to': @smart_contract_address
'data': IDmethod & arguments
}
signed by private_key_issuer
in which:
1. @account_issuer represents the address of the issuing account (EOA) from which the transaction was issued. This public address is obtained by hashing the public key corresponding to the specific private key, as explained above;
2. @smart_contract_address represents the address of the smart contract deployed on the blockchain;
3. IDmethod& arguments represent the function (the method) of the smart contract called by the transaction, and the input arguments, respectively;
4. private_key_issuer designates the specific private key.

The invention claimed is:

1. A method of authenticating a user of a blockchain, the user having a hierarchical deterministic private key generation wallet, organized in a hierarchical tree structure of nodes, with branches between the nodes, wherein each node has a corresponding index identifying the node, the method comprising:
   determining, by the user, a particular identifier that uniquely identifies a particular smart contract of a plurality of smart contracts deployed on the blockchain to which the user can submit a transaction;
   determining a specific private key to the particular smart contract by (1) identifying, among all paths within the hierarchical tree structure, a particular path between a master private key of the user at a root node of the hierarchical tree structure and the specific private key specific to the particular smart contract at a particular leaf node of the hierarchical tree structure, the determined particular path traversing a plurality of particular nodes within the hierarchical tree structure, wherein the particular path is defined by a sequence of indices, an index or indices of at least one of the particular nodes are identical to the particular identifier, and (2) calculating the specific private key using the sequence of indices defining the particular path to the particular leaf node corresponding to the particular smart contract;
   generating, by the user, the transaction, which includes an issuing account address of the user, signing the transaction using the specific private key, and transmitting the transaction to the particular smart contract; and
   verifying, by the particular smart contract, after reception of the transaction, a validity of the signature and further verifying that the transaction was actually issued by the issuing account address by obtaining an account address by hashing a public key corresponding to the determined specific private key, and comparing the issuing account address included in the transaction to the obtained account address.

2. The authentication method according to claim 1, wherein the hierarchical deterministic key generation wallet conforms with a BIP-32 structure.

3. The authentication method according to claim 1, wherein the particular smart contract cannot use the issuing account address to obtain the user's identity directly.

4. The authentication method of claim 1, wherein the generating step comprises generating the transaction to include the issuing account address and an address of the particular smart contract.

5. A method of authenticating a user of a blockchain, the user having a hierarchical deterministic private key generation wallet, organized in a hierarchical tree structure of nodes, with branches between the nodes, wherein each node has a corresponding index identifying the node, the method comprising:

determining, by the user, a particular smart contract of a plurality of smart contracts deployed on the blockchain to which the user can submit a transaction;

determining a specific private key to the particular smart contract by (1) identifying, among all paths within the hierarchical tree structure, a particular path between a master private key of the user at a root node of the hierarchical tree structure and the specific private key specific to the particular smart contract at a particular leaf node of the hierarchical tree structure, the determined particular path traversing a plurality of particular nodes within the hierarchical tree structure, wherein the particular path is defined by a sequence of indices, and at least one of the particular nodes has a corresponding index that uniquely identifies the particular smart contract, and (2) calculating the specific private key using the sequence of indices defining the particular path to the particular leaf node corresponding to the particular smart contract;

generating, by the user, the transaction, which includes an issuing account address of the user, signing the transaction using the specific private key, and transmitting the transaction to the particular smart contract; and verifying, by the particular smart contract, after reception of the transaction, a validity of the signature and further verifying that the transaction was actually issued by the issuing account address by obtaining an account address by hashing a public key corresponding to the determined specific private key, and comparing the issuing account address included in the transaction to the obtained account address; wherein the corresponding index of one of the particular nodes on the particular path is a name of the particular smart contract and/or a symbol defining the particular smart contract and/or a contract address of the particular smart contract on the blockchain.

6. The authentication method according to claim 5, wherein the hierarchical deterministic key generation wallet conforms with a BIP-32 structure.

7. The authentication method according to claim 6, wherein the particular smart contract cannot use the issuing account address to obtain the user's identity directly.

8. The authentication method of claim 6, wherein the generating step comprises generating the transaction to include the issuing account address, an address of the particular smart contract, and a designation of the specific private key.

9. A method of authenticating a user of a blockchain, the user having a hierarchical deterministic private key generation wallet, organized in a hierarchical tree structure of nodes, with branches between the nodes, wherein each node has a corresponding index identifying the node, the method comprising:

determining, by the user, a particular smart contract of a plurality of smart contracts deployed on the blockchain to which the user can submit a transaction;

determining a specific private key to the particular smart contract by (1) identifying, among all paths within the hierarchical tree structure, a particular path between a master private key of the user at a root node of the hierarchical tree structure and the specific private key specific to the particular smart contract at a particular leaf node of the hierarchical tree structure, the determined particular path traversing a plurality of particular nodes within the hierarchical tree structure, wherein the particular path is defined by a sequence of indices, and at least one of the particular nodes has a corresponding index that uniquely identifies the particular smart contract, and (2) calculating the specific private key using the sequence of indices defining the particular path to the particular leaf node corresponding to the particular smart contract;

generating, by the user, the transaction, which includes an issuing account address of the user, signing the transaction using the specific private key, and transmitting the transaction to the particular smart contract; and verifying, by the particular smart contract, after reception of the transaction, a validity of the signature and further verifying that the transaction was actually issued by the issuing account address by obtaining an account address by hashing a public key corresponding to the determined specific private key, and comparing the issuing account address included in the transaction to the obtained account address; wherein the contract address on the blockchain is represented by a plurality of bytes and the corresponding indices of a sequence of nodes of the particular path are bytes of said plurality of bytes.

10. The authentication method according to claim 9, wherein the hierarchical deterministic key generation wallet conforms with a BIP-32 structure.

11. The authentication method according to claim 9, wherein a last branch of the particular path leads to the particular leaf node of the hierarchical tree structure, the specific private key being generated at the particular leaf node.

12. The authentication method according to claim 9, wherein the particular smart contract cannot use the issuing account address to obtain the user's identity directly.

13. The authentication method of claim 8, wherein the generating step comprises generating the transaction to include the issuing account address, and an address of the particular smart contract.

\* \* \* \* \*